United States Patent [19]

Velling et al.

[11] Patent Number: 4,478,725
[45] Date of Patent: Oct. 23, 1984

[54] PROCESS FOR THE OXIDATION OF HYDROGEN SULPHIDE DISSOLVED IN THE WASTE WATER FROM A COAL GASIFICATION PROCESS

[75] Inventors: Günther Velling, Bornheim; Norbert Brüngel, Cologne, both of Fed. Rep. of Germany

[73] Assignee: Rheinische Braunkohlenwerke AG, Cologne, Fed. Rep. of Germany

[21] Appl. No.: 476,574

[22] Filed: Mar. 18, 1983

[30] Foreign Application Priority Data

Mar. 18, 1982 [DE] Fed. Rep. of Germany ....... 3209856

[51] Int. Cl.$^3$ .............................................. C02F 1/72
[52] U.S. Cl. .................................... 210/703; 210/763; 210/765; 210/916
[58] Field of Search ............... 55/73, 85, 89; 210/703, 210/704, 712, 721, 724, 765, 763, 916

[56] References Cited

U.S. PATENT DOCUMENTS

| | | | |
|---|---|---|---|
| 3,186,942 | 6/1965 | Benger | 210/763 |
| 3,817,862 | 6/1974 | Hoke | 210/763 |
| 4,264,451 | 3/1981 | Pope et al. | 210/763 X |

Primary Examiner—Thomas Wyse
Attorney, Agent, or Firm—Howson and Howson

[57] ABSTRACT

Hydrogen sulphide in the waste water from a coal gasification installation is subjected to an oxidizing treatment in the presence of the very fine-grain residual coke which, being washed out of the product gas, is suspended in the waste water, the residual coke particles thus serving as a catalyst. When using air for the oxidation treatment, with the usual period of treatment, it is possible to achieve virtually quantitative conversion of the hydrogen sulphide to sulphate. If the solid particles are to be removed from the waste water by a flotation step, the flotation operation and the oxidizing treatment can be performed simultaneously in a common apparatus.

8 Claims, 1 Drawing Figure

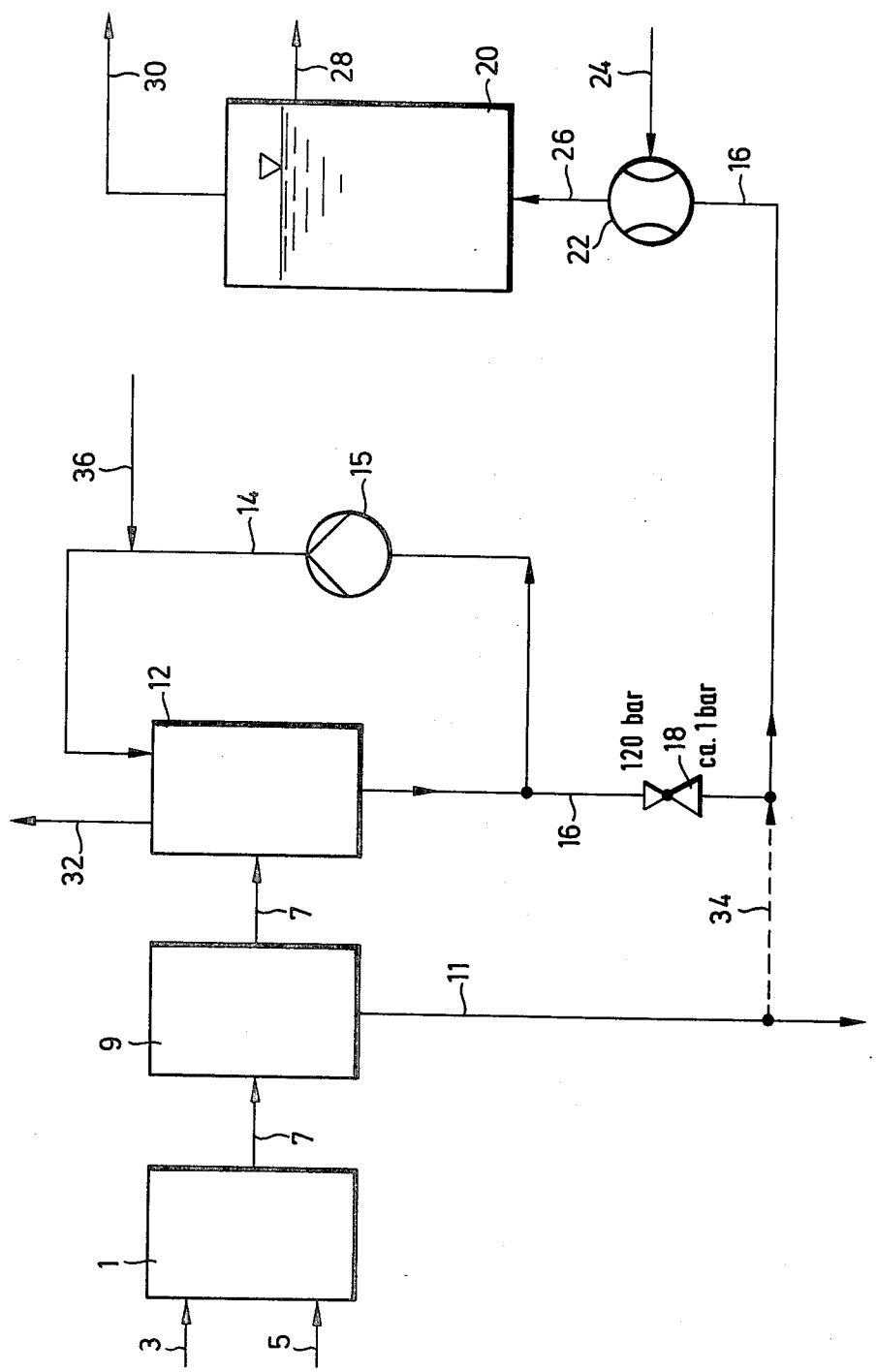

PROCESS FOR THE OXIDATION OF HYDROGEN SULPHIDE DISSOLVED IN THE WASTE WATER FROM A COAL GASIFICATION PROCESS

BACKGROUND OF THE INVENTION

The present invention relates to a process for the oxidation of hydrogen sulphide dissolved in waste water, containing fine carbon-bearing solid particles, from a coal gasification installation.

In a gasification process such as in the hydrogenating gasification of carbonaceous solid material, a part of the solid carbon-bearing residue, which is often referred to as residual coke, is discharged from the reactor with the product gas. Although a considerable part of that solid material may be removed from the product gas, in a dry condition, by means of a cyclone separator, there is always a certain amount of very fine-grain solid material, with a grain size of from 0 to 0.5 mm and predominantly from 0 to 0.2 mm, that remains in the product gas, and that remaining solid material is washed out by a scrubbing operation using water. However, in that operation, inevitably a part of the hydrogen sulphide contained in the product gas goes into solution in the water, with the result that the slurries that are thus formed by the water with the solid particles suspended therein, besides other compounds, in particular $NH_3$, phenols and hydrocarbon, also contains hydrogen sulphide.

The gas scrubbing operation is normally performed under the elevated pressure at which the entire gasification system is usually operated, which can be up to 120 bars or even more. The result of that is that, when the slurry leaves the system which is being operated under the above-mentioned elevated pressure, the slurry accordingly undergoes expansion whereupon a part of the hydrogen sulphide dissolved in the waste water of the slurry necessarily goes back into the gaseous phase and is thus separated out of the slurry. At any event however, the waste water still contains a residual amount of hydrogen sulphide which must be removed before the waste water can be discharged for example to a biological purification apparatus, a sewerage system or a main channel of a sewerage system. For that purpose, it is sufficient to oxidise the sulphides in the waste water, as the oxidation levels of the sulphide, with the relative amounts involved, cannot be considered as giving rise to problems for example in a biological purification process or when the material is passed into a sewerage system.

A process has been put forward (German Offenlegungsschrift No. 23 34 994), for the oxidation of sulphide-bearing waste water, also concerned inter alia with the conversion of $H_2S$ into sulphates, the process being operated at an increased pressure of from 5 to 56 bars and involving the use of a transition metal catalyst. It is accordingly necessary to produce an increased pressure with a consequent not inconsiderable capital expenditure on apparatus, while the use of the transition metal catalyst also gives rise to additional operating costs.

In a further process (German Offenlegungsschrift No. 2654 937) for the removal of phenols and other organic substances from waste water, including waste water from a gasification installation, a fine carbon-bearing material which is removed from a fluidised bed gasification installation by the product gas is used as an adsorption agent, while a stripping operation, in other words a physical process, is carried out to remove hydrogen sulphide.

In another process (German Offenlegungsschrift No. 27 40 706) for treating waste water coal is also used as an adsorption agent and in addition, in connection with the presence of sulphur compounds, an oxygen-containing gas is introduced into the waste water. However, that is effected in order to prevent the production of aerobic microorganisms which in turn can form hydrogen sulphide. Accordingly, that specification presupposes that any sulphur compounds to be removed are not present in the form of hydrogen sulphide, and therefore that process is also not concerned with converting hydrogen sulphide into an environmentally safe form.

Another process (German Offenlegungsschrift No. 23 41 228) for decontaminating cyanide-bearing waste waters comprises using a suspension of ash in water, which is produced by scrubbing out fly ash particles, which do not contain any carbon constituent, from the product gas of a gasifier. In that process, any hydrogen sulphide is removed by chemical reaction thereof with the ash which therefore acts as a reagent.

SUMMARY OF THE INVENTION

An object of the present invention is to provide a process for the oxidation of hydrogen sulphide dissolved in waste water from a coal gasification process, in a simple manner.

Another object of the present invention is a process for the removal of hydrogen sulphide from waste water by at least substantially quantitative oxidation.

Yet another object of the present invention is to provide a process for the oxidation of hydrogen sulphide in waste water, using oxygen in the air, preferably with sulphate formation.

A further object of the present invention is the oxidation of hydrogen sulphide in waste water from coal gasification, which can be carried out under atmospheric pressure.

A still further object of the invention is to provide for the oxidation of the hydrogen sulphide dissolved in waste water from a coal gasification installation, using readily available material and without requiring a complicated operating apparatus.

These and other objects are achieved by a process for the oxidation of hydrogen sulphide dissolved in waste water from a coal gasification process, wherein the waste water is treated to oxidise the dissolved hydrogen sulphide, in the presence of the finely divided carbon-bearing solid particles contained in the waste water. That residual coke, suspended in the water, serves as a catalyst, with the result that the conversion reaction is accelerated and optimised, so that it is possible to achieve virtually quantitative oxidation of the hydrogen sulphide, within periods of time which are readily feasible under practical operating circumstances, even with a relatively small excess of air.

Quantitative adjustment of the amount of solid carbonaceous material in the waste water, in order to produce a reaction which is as quantitative as possible, in a short period of time, can be effected by a procedure wherein at least a part of the untreated waste water, for the purposes of enrichment with carbon-bearing solid particles, is recirculated or recycled, that is to say, passed one or more additional times through the apparatus in which the solid particles are washed out of the product gas. It will be appreciated that, in that operation, additional hydrogen sulphide is also dissolved in the waste water. At the same time however, the fact that the gas flows through the water has the result that a part of the hydrogen sulphide which is already in solution therein is again stripped out, that is to say, removed, so that taken overall, there is no substantial increase in the amount of hydrogen sulphide in the water. However, even such increase as occurs is without major significance because, at least when the water is expanded after the scrubbing operation and before the oxidising treatment, that is to say, when the pressure to which the waste water is subjected is reduced, a large proportion of the dissolved hydrogen sulphide goes back into the gaseous phase so that it then has to be removed from the exhaust air. However, that is generally a less difficult operation than rendering environmentally harmless hydrogen sulphide which remains dissolved in the water.

It should be noted that the desired virtually quantitative conversion of the hydrogen sulphide can be achieved when the waste water oxidation treatment is performed under atmospheric pressure. In that operation, the temperatures of the water are preferably in the range of from 50° to 100° C.; it will be appreciated however, that no additional expenditure is required for that purpose, as the waste water is already suitably heated in the gas scrubber, by the product gas to be cleaned.

The pH-value of the waste water will be in the alkaline range and will preferably be 9 or above. There is generally no need for particular adjustment of the pH-value by the addition of alkalies as $NH_3$ is also scrubbed out from the product gas in the scrubbing operation, thereby ensuring that under normal circumstances the pH-value is in the alkaline range. If necessary however, it is also possible to add one or more alkaline substances to the waste water before the oxidising treatment.

It is also possible to add to the water further finegrain carbonaceous solid material, in addition to the carbon-bearing solid particles which are scrubbed out of the gas by the waste water. For that purpose, use can be made for example of a fine-grain material which has been previously separated out of the product gas by a cyclone separator, prior to the operation of scrubbing the gas with the water. Under normal operating conditions in the gasification installation and the oxidation apparatus, the addition of further residual coke to the waste water will not generally be necessary because, as stated above, suitable recycling of the waste water readily makes it possible to adjust the content of carbon-bearing solid particles, as is required to produce the desired catalyst action. Generally, a residual coke content of 1 g/l waste water is sufficient to cause the desired effect to occur. However, the possibility cannot be excluded that, during certain phases of operation, for example when starting up the installation, there may not be enough or sufficiently surface-active carbon-bearing particles in the waste water. In such circumstances, it may be necessary or at least desirable to add additional residual coke. Moreover, it must be appreciated that it is possible for suspended carbon-bearing solid particles also to serve as an adsorbing agent for other undesirable compounds which may be present in the waste water. Depending on the amount of such compounds, the situation may occur that the amount of solid particles which are removed in the scrubbing operation is not sufficient for that purpose. It may also happen that, as a result of the above-indicated other compounds being adsorbed by the residual coke particles, the catalytic activity thereof is detrimentally affected so that for that reason also it may be necessary to add additional residual coke. In that case also, it is possible to provide for adjustment of the amounts of residual coke particles that are required under the prevailing circumstances, in the waste water to be treated, by recirculating the water as referred to above.

The process can be carried into effect in a particularly advantageous manner by the carbon-bearing solid particles being removed from the waste water by flotation. In that case, at least a part of the hydrogen sulphide dissolved in the water can be oxidised by the oxygen-bearing gas, generally air, which is introduced into the waste water for the flotation step. In that mode of procedure, there is no need for a particular apparatus for supplying the oxygen, as is otherwise required, especially as very fine distribution of the oxygen-bearing gas mixture is in any case required in the flotation operation.

BRIEF DESCRIPTION OF THE DRAWING

An embodiment of a process according to the invention will now be described by way of example with reference to the drawing showing a flow chart illustration of an installation for the hydrogenating gasification of coal.

DESCRIPTION OF THE PREFERRED EMBODIMENT

Referring therefore to the drawing, reference numeral 1 therein denotes a gasification reactor which is fed with carbon-bearing material at 3 and a hydrogen-bearing gasification agent at 5. The reactor is generally for example in the form of a fluidised bed reactor. The reactor 1 produces a product gas as indicated at 7, from which coarse dust is removed in a suitable separator such as a cyclone separator 9. Dust which is separated off in the separator 9 is removed therefrom at 11. The gas 7 from which the coarse dust has been removed then passes into a scrubber 12 in which fine dust remaining in the product gas is removed by scrubbing with water. The water is circulated through the scrubber by means of a circuit indicated by a conduit 14, which includes a suitable pump 15. It will be appreciated that the water may be circulated through the unit 12 one or more times, to give the required content of carbonaceous matter in the water. Part of the flow of water from the unit 12 is passed into an oxidation vessel 20 by way of a conduit 16 which includes a pressure reducing valve 18 (120 bar—about 1 bar). The oxidation vessel 20 may be for example a flotation cell. The conduit 16 includes a water-air mixing device diagrammatically indicated at 22 which communicates with a conduit 24 for a feed of air into the water. The resulting waste water-air mixture passes into the oxidation vessel 20, through a conduit 26. In the oxidation vessel 20, hydrogen sulphide in waste water is oxidised in the presence of the very fine-grain residual coke which is suspended in the water, having been washed out in the scrubber 12. The resulting at least substantially $H_2S$-free water is possibly passed by way of a conduit 28 to a means for removing the solid carbonaceous matter which is suspended in the water, if the solid particles have not also been removed from the water in the oxidation vessel 20. Exhaust air is discharged through the conduit 30.

Reference numeral 32 denotes a conduit for the discharge from the scrubber 12 of product gas which is virtually completely free of solid material and which has also been cooled down, the gas thus being passed on for further use.

The conduit 11 for the coarse dust which is removed from the product gas in the cyclone separator 9 may also have connected thereto a branch conduit 34, by means of which, if necessary, dust separated out in the cyclone separator may be introduced into the conduit 16 and the water which flows through the conduit 16 to the oxidation vessel 20, if that addition of dust is necessary under certain operating conditions, as referred to above, to adjust the amount of residual coke in the water. In addition, it is readily possible for the system to be so arranged and controlled that waste water from the circuit 14 is passed to the oxidation vessel 20 through the conduit 16 only when the waste water contains a predetermined minimum amount of suspended fine-grain residual coke therein.

Fresh water is supplied to the circuit 14 through a conduit 36, to make up the amount of water which is removed from the circuit through the conduit 16.

The effect which can be produced by means of the invention will be clearly apparent from the following Table which sets forth the results of tests in which waste water from an installation for the hydrogenating gasification of coal was oxidised using the above-described process of this invention.

|   |   |   | Test 1 | Test 2 | Test 3 |
|---|---|---|---|---|---|
| 1. | H$_2$S inlet oxidation | mg/h | 4800 | 9300 | 13330 |
| 2. | H$_2$S outlet oxidation | mg/h | no longer quantifiable | 130 | 170 |
| 3. | H$_2$S in exhaust air | mg/h | 65 | 530 | 190 |
| 4. | Difference between line 1 and 2/3 | mg/h | 4735 | 8640 | 12970 |
| 5. | Converted H$_2$S | % | 98.6 | 92.9 | 97.3 |
| 6. | Residual H$_2$S removed with exhaust air | % | 1.4 | 5.7 | 1.4 |

The total of the values of lines 5 and 6 does not necessarily amount to 100 as small amounts of H$_2$S may remain in the waste water.

It will be seen from the foregoing that the above-described process enjoys simplicity, and also a high level of economy as the catalyst used is a material which is in any case contained in the waste water and, as there is always a fresh supply thereof with waste water, always produces its best possible effect.

Various other modifications may be made in the above-described process without thereby departing from the scope of the invention as defined by the appended claims.

It will be noted that the process provides for at least substantially quantitative oxidation of the hydrogen sulphide, using a readily available material and without requiring a complicated operating apparatus in a liquid-phase mode of operation. The process can be carried out under atmospheric pressure, using oxygen from the air, preferably with the formation of sulphate. The period of time for performing the oxidation treatment is readily feasible for practical operation, preferably being at least five minutes, even with a relatively small excess of air, with the residual coke suspended in the waste water serving as a catalyst to optimise and accelerate the hydrogen sulphide conversion reaction. It will also be noted that, if the solid particles are to be removed from the water by a flotation step, as referred to above, the flotaton operation and the oxidising treatment may be performed simultaneously in a common apparatus, as described.

What is claimed is:

1. A process for the oxidation of hydrogen sulphide dissolved in waste water from a scrubbing operation for removing fine-grained carbon-bearing solid particles from the product gas of a coal gasification process, comprising treating the waste water for oxidation of said hydrogen sulphide dissolved therein in the presence of said fine-grain carbon bearing solid particles contained in said waste water, and recycling at least a part of said waste water before said oxidation treatment to said scrubbing operation to enrich said waste water with said solid carbonaceous particles.

2. A process as set forth in claim 1 comprising circulating at least a part of the said waste water before said oxidation treatment to enrich said waste water with solid carbonaceous particles.

3. A process as set forth in claim 2 wherein, when said gasification process is performed under increased pressure, said circulation of said at least part of said waste water is carried out in a part of the gasification installation which is under increased pressure.

4. A process as set forth in claim 3 wherein said oxidation treatment of the waste water is performed under atmospheric pressure.

5. A process as set forth in claim 1 wherein an alkaline substance is added to the waste water before the oxidation treatment thereof, to adjust the pH- value thereof.

6. A process as set forth in claim 1 wherein in addition to solid particles contained in said waste water by being washed out of the coal gasification product gas by the waste water, further fine-grain solid carbonaceous material is added to the waste water before the oxidising treatment is performed.

7. A process as set forth in claim 1 wherein the duration of the oxidation treatment is at least 5 minutes.

8. A process for the oxidation of hydrogen sulphide dissolved in waste water from a scrubbing operation for removing fine-grained carbon-bearing solid particles from the product gas of a coal gasification process, comprising treating the waste water for oxidation of said hydrogen sulphide in the presence of fine-grain carbon-bearing solid particles contained in said waste water, circulating at least a part of said waste water before said oxidation treatment to said scrubbing operation to enrich said waste water with said solid carbonaceous particles, effecting oxidation of at least a part of said hydrogen sulphide by introducing an oxygen-containing gas into said waste water, and removing solid particles from said waste water by flotation of said particles resulting from the introduction of said oxygen-containing gas to said waste water.

* * * * *